United States Patent [19]

Baranyai et al.

[11] Patent Number: 4,873,663

[45] Date of Patent: Oct. 10, 1989

[54] CONTROL MEMORY USING RECIRCULATING SHIFT REGISTERS FOR A TDM SWITCHING APPARATUS

[75] Inventors: Lawrence Baranyai, Howell; Dominick Scordo, Middletown, both of N.J.

[73] Assignees: American Telephone and Telegraph Company, New York, N.Y.; AT&T Bell Laboratories, Murray Hill, N.J.

[21] Appl. No.: 185,653

[22] Filed: Apr. 25, 1988

[51] Int. Cl.⁴ .................. G11C 21/00; G11C 19/00
[52] U.S. Cl. .................................... 365/73; 365/78; 365/189.07; 365/233; 370/100.1; 375/112; 375/118
[58] Field of Search ............... 365/73, 78, 189, 240, 365/75, 233, 189.07, 189.12; 370/100; 375/106, 122, 118

[56] References Cited

U.S. PATENT DOCUMENTS

| | | | |
|---|---|---|---|
| 2,527,650 | 10/1950 | Peterson | 370/100 |
| 3,742,466 | 6/1973 | Hamm et al. | 365/73 |
| 4,494,232 | 1/1985 | Dambrackas et al. | 370/80 |
| 4,503,490 | 3/1985 | Thompson | 365/233 |
| 4,740,962 | 4/1988 | Kish, III | 370/100 |
| 4,748,623 | 5/1988 | Fujimoto | 370/100 |
| 4,760,382 | 3/1972 | Itoh | 365/73 |

Primary Examiner—Glenn A. Gossage
Attorney, Agent, or Firm—Thomas Stafford

[57] ABSTRACT

A memory matrix for storing control words for controlling a common control time division multiplexed (TDM) switch is formed by employing a plurality of shift registers connected in recirculating configuration. Synchronization of control word time slots in the memory matrix to system timing is realized by storing a timing marker which is advanced in identical manner as the control word time slots. If synchronization between the system timing and control word time slots is interrupted, it is restored by controllably inhibiting advancing of the control word time slots and the stored timing marker.

8 Claims, 4 Drawing Sheets

CONTROL MEMORY USING RECIRCULATING SHIFT REGISTERS FOR A TDM SWITCHING APPARATUS

TECHNICAL FIELD

This invention relates to control memory units and, more particularly, to control memory units including shift registers for controlling time division multiplexed switching apparatus.

BACKGROUND OF THE INVENTION

In order to control digital time division multiplexed (TDM) signal paths through a TDM switch, control signals are supplied to the switch from a so-called control memory. The control memory stores the TDM switch control signals, i.e., control word time slots, which control the route that each of the digital TDM signals traverses through the TDM switch.

Typically, random access memory (RAM) units have been employed for this purpose. In such prior known systems, proper correlation is obtained between time slots of the digital TDM signals being switched and corresponding control words from the RAM control memory by employing a sequential address generator which is synchronized to a TDM switching system timing signal. Control words are written into the RAM control memory and, then, read sequentially for each TDM switch data frame.

A problem with using a RAM memory unit for a TDM switch control memory is that a RAM is inefficient from capacity, size, power and cost standpoints. It just has more capacity and capability than is needed for the control memory task.

Shift registers have been used as memory units in such arrangements as digital signal processors, echo cancelers and the like. However, shift registers have not been used, heretofore, in a control memory for common control time division multiplexed switching systems because of synchronization problems and because the stored contents of the memory may be corrupted if synchronization is lost.

SUMMARY OF THE INVENTION

The limitations and problems associated with prior known control memory units are overcome, in accordance with an aspect of the invention, by employing a unique synchronization technique in conjunction with shift registers connected in a recirculating configuration to realize a common control memory.

More specifically, a plurality of shift registers connected in the recirculating configuration is used to form a matrix of memory cells for storing a plurality of control words in so-called control time slots. Synchronization of the control time slots in the memory matrix with system timing is realized by storing a timing marker which is referenced to a system timing synchronization pattern. The stored timing marker is advantageously used to automatically resynchronize the control time slots in the memory matrix after interruption of the system timing. Resynchronization is achieved by comparing the stored timing marker with the restored system timing synchronization pattern. If there is no match between the timing marker and synchronization pattern, advancing of the timing marker and of the control word time slots in the memory matrix is controllably inhibited until there is a match. Upon obtaining a match, the timing marker and control time slots are again allowed to advance without interruption. More particularly, during each synchronization interval, e.g., data frame, that there is no match between the timing marker and synchronization pattern, advancing of the timing marker and control time slots is inhibited for a predetermined portion of the synchronization interval. In a specific example, the advancing is inhibited for one clock interval during each data frame until a match is obtained.

In one specific embodiment, the timing marker is stored in a shift register connected in a recirculating configuration similar to that of those forming the control memory matrix and is advanced therein in the same manner as the control time slots in the shift registers of the control memory matrix.

DESCRIPTION OF THE PREFERRED EMBODIMENT

Figure 1:
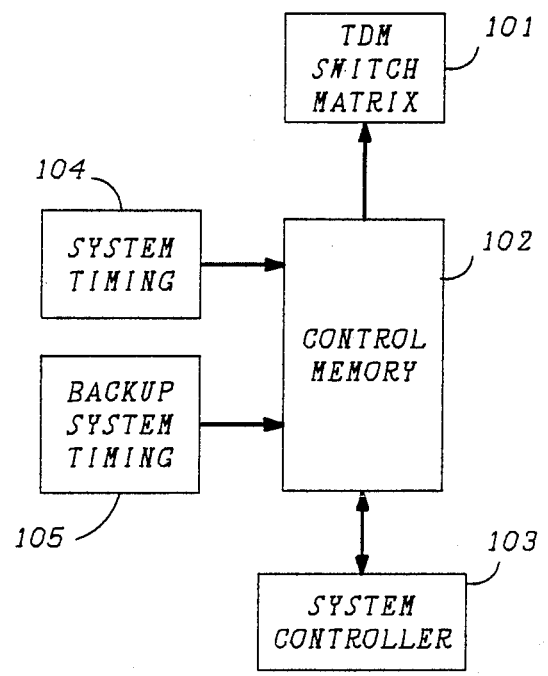
FIG. 1 shows in simplified block diagram form a time division multiplexed switch system employing a control memory in accordance with an aspect of the invention.

FIG. 1 shows in simplified block diagram form a typical switch arrangement employing an embodiment of the invention. Accordingly, shown is switch matrix 101 which, in this example, is a time division multiplexed (TDM) switch for controllably switching digital signals on incoming communication links to outgoing communication links. Control memory 102 supplies, in accordance with an aspect of the invention, control words in so-called control time slots for controlling TDM switch matrix 101 to select the desired switch connections for the digital TDM signals on the incoming links to the outgoing links. System controller 103 supplies the control words which are stored in control memory 102, in well-known fashion. System timing unit 104 provides primary system timing reference signals which are generated, in well-known fashion. Backup system timing unit 105 provides an alternate source of the primary system timing reference signals. In this example, the timing reference signal, commonly referred to as the CLOCK signal, is at a rate of approximately 27 mega Hz.

Figure 2:
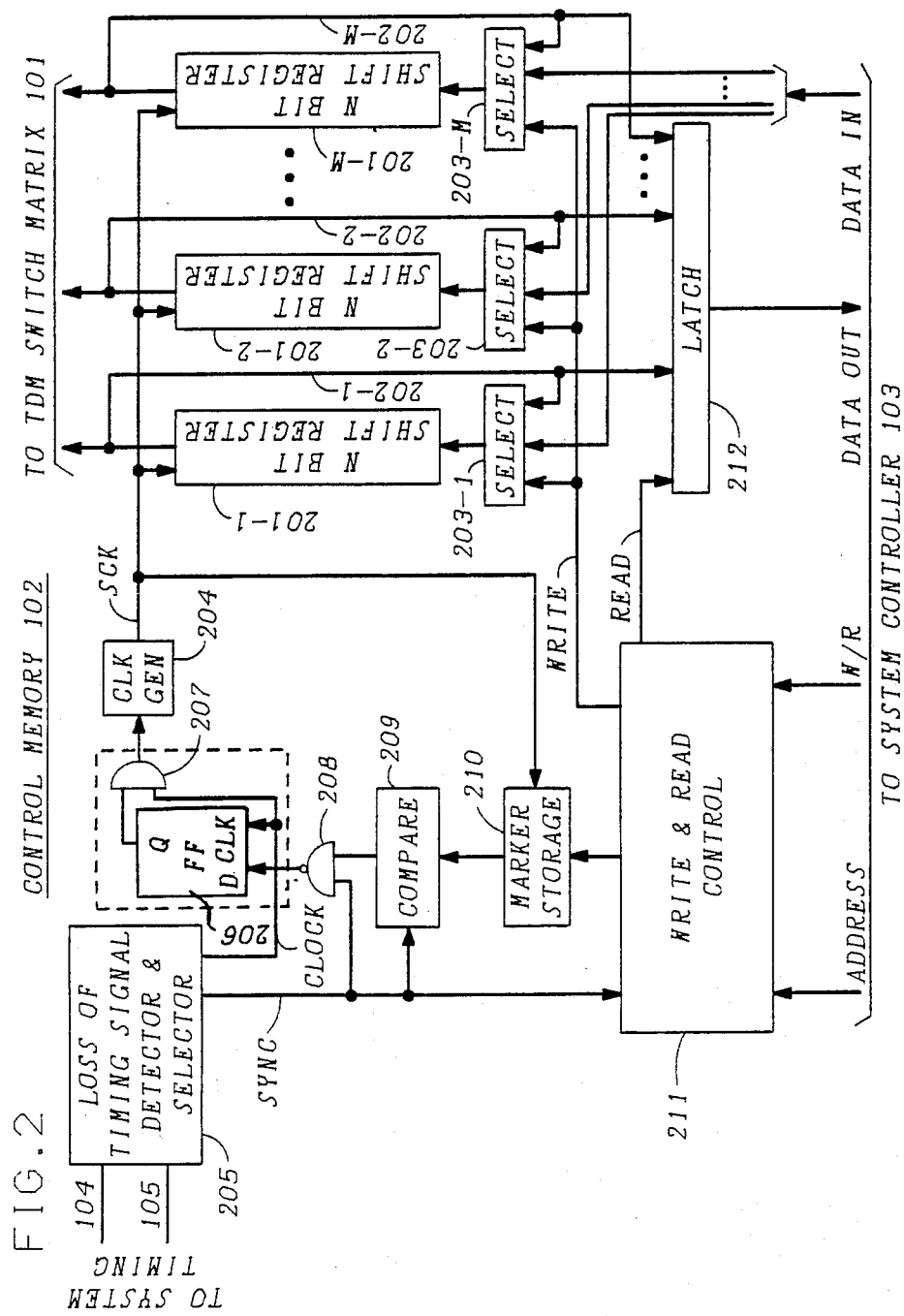
FIG. 2 depicts in simplified block diagram form details of a common control memory including one embodiment of the invention.

FIG. 2 depicts in simplified block diagram form details of control memory 102 including a preferred embodiment of the invention. Accordingly, shown are a plurality of shift registers 201-1 through 201-M. Each of shift registers 201-1 through 201-M has N stages and is connected in a recirculating configuration via circuit paths 202-1 through 202-M, respectively. In this example, shift registers 201 are of the so-called dynamic type. Use of dynamic shift registers provides a memory matrix of minimum area and, hence, minimum cost. Consequently, more area is available for other circuit components in such systems.

Select units 203-1 through 203-M are associated on a one-to-one basis with shift registers 201-1 through 201-M, respectively, and are used normally to recirculate the data bits. Additionally, select units 203-1 through 203-M are employed to controllably write control words in parallel from system controller 103 (FIG. 1) into the M×N memory matrix formed by shift registers 201-1 through 201-M. M and N may each be any desired integer number. In one example, not to be construed as limiting the scope of the invention, M is 10 and N is 16. N also corresponds to a data frame for TDM switch matrix 101 (FIG. 1). As will be apparent to those skilled in the art, control memory 102 is expandable by a desired number of M×N memory matrix units. In a specific example, 16 such M×N control memory matrix units are employed. A control word to be inserted into a control time slot in the memory matrix, in this example, includes 10 bits. Eight of the control word bits include a switch address, while the two remaining bits are used for so-called overhead.

The control words in the control time slots are sequentially advanced in shift registers 201 and sequentially supplied to TDM switch matrix 101 (FIG. 1) via SCK signals from CLK generator 204. CLK generator 204 generates a pair of so-called non-overlapping SCK signals in response to the system CLOCK signal, in well-known fashion. The non-overlapping SCK signal pair is used to clock the dynamic shift registers 201-1 through 201-M. The SCK signal pair is also shown as being supplied to marker storage unit 210 which, in this example, is also a N-bit dynamic shift register. Although a dynamic shift register is advantageously employed for marker storage unit 201, any other appropriate storage unit may equally be employed, for example, a counter of the like.

Figure 3:
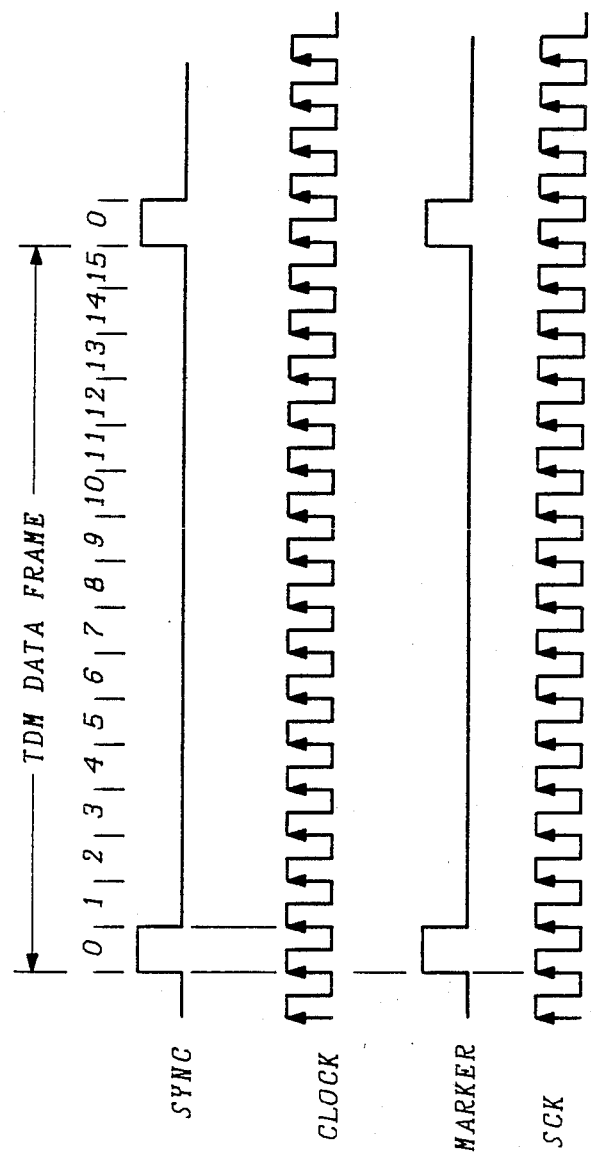
FIG. 3 illustrates a timing diagram useful in describing operation of the embodiment of FIG. 2.

The system CLOCK and SYNC timing signals are obtained from either system timing unit 104 or backup system timing unit 105 (FIG. 1) under control of loss of timing signal detector and selector 205. Operation of loss of timing signal detector and selector 205 is well known in the art. Upon loss of the system timing signal from unit 104 (FIG. 1), a switch is made to the backup system timing unit 105 (FIG. 1). The relationship between the system CLOCK signal and system SYNC signal is shown in FIG. 3. As shown in this example, a SYNC pulse is generated at the beginning of each TDM data frame which, in this example, is 16 CLOCK pulses. CLOCK is supplied to a clock input of flip-flop 206 and one input of AND gate 207. An output from flip-flop 206 is supplied to a second input of AND gate 207. Flip-flop 206, in this example, is a D type which operates to output the state of the signal supplied to its D input upon the occurrence of the next CLOCK pulse being supplied to its clock input. Flip-flop 206 and AND gate 207 form an inhibitor for controllably inhibiting CLK generator 204 to thereby inhibit generation of a SCK pulse pair. Such inhibition of SCK, in turn, inhibits advancing of the control words in shift registers 201 and the timing marker in marker storage unit 210, in accordance with an aspect of the invention.

System SYNC is supplied to one input of NAND gate 208, compare circuit 209 and write and read control 211.

Write and read control 211 responds to address, SYNC and write/read (W/R) control signals from system controller 103 (FIG. 1) to write a timing marker signal into marker storage unit 210 at an appropriate address. In this example, the timing marker storage address corresponding to time slot zero (0). However, any desired address may be advantageously employed whether a time slot address or not. Additionally, write and read control 211 responds to address signals, SYNC and the appropriate write control signal to write the control words into shift register 201 via select units 203 as desired. System SYNC provides a reference for writing the control words into appropriate control time slots in the control memory matrix. Write and read control 211 is also responsive to address signals and a read control signal from system controller 103 to generate a read signal to enable latch 212 to temporarily store the control words recirculating in shift registers 201. The control words stored in latch 212 are supplied to system controller 103 for verification purposes.

Figure 4:
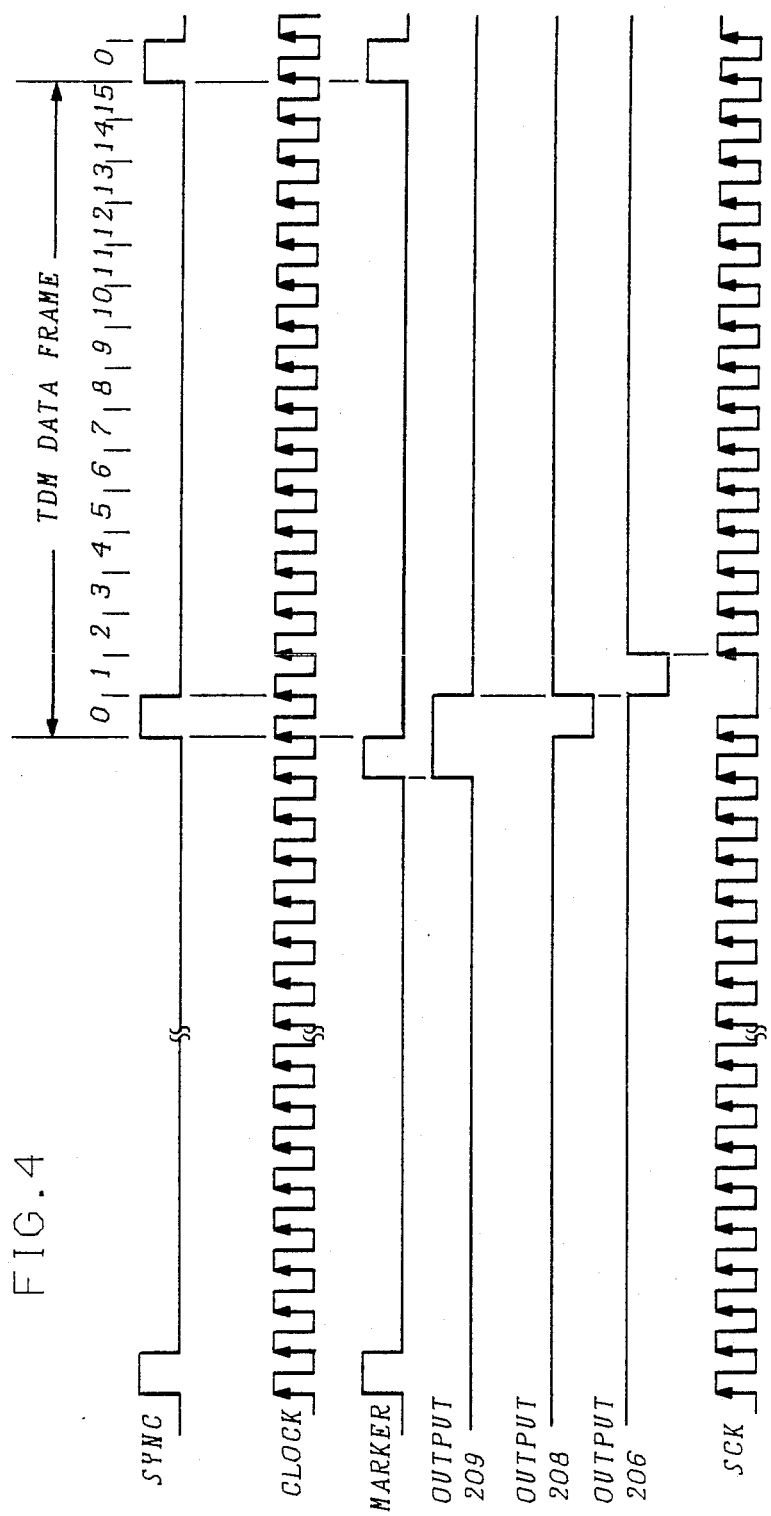
FIG. 4 shows another timing diagram also useful in describing operation of the embodiment of FIG. 2.

An output from marker storage unit 210 is supplied to compare unit 209. Compare unit 209 compares whether or not the timing marker stored and being advanced in marker storage unit 210 is in synchronism with the system SYNC signal. An output from compare unit 209 is supplied to a second input of NAND gate 208. Normally, the output from compare unit 209 is a low state corresponding to a logical 0. When there is no match between system SYNC and the output from marker storage unit 210, the output from compare unit 209 is a high state corresponding to a logical 1, as shown in FIG. 4. Normally, the output of NAND gate 208 is a high state corresponding to a logical 1, also shown in FIG. 4. However, when synchronism is lost and the output from compare unit 209 is a logical 1 concurrently with SYNC, the output of NAND gate 208 becomes a low state corresponding to a logical 0, as shown in FIG. 4. Thus, compare unit 209 and NAND gate 208 form a comparator for generating a control signal which is a logical 0 whenever the timing marker does not occur concurrently with SYNC. This logical 0 output is applied to the D input of flip-flop 206 and upon the occurrence of the next CLOCK pulse supplied to the clock input of flip-flop 206, a low state corresponding to a logical 0 is generated at the output of flip-flop 206. This low state output from flip-flop 206 inhibits AND gate 207 from supplying a CLOCK pulse to CLK generator 204. Consequently, generation of a SCK pulse pair is inhibited (FIG. 4) which, in turn, inhibits advancing of the control words in the memory time slots of shift registers 201 and the timing marker in marker storage unit 210, in accordance with an aspect of the invention. Consequently, the control word advance in shift registers 201 and the timing marker advance in marker storage unit 210 are delayed one time slot interval during the TDM data frame and, in this example, will then be in synchronism for the next TDM data frame, as shown in FIG. 4. If the timing marker was out of synchronism by more than one time slot, additional inhibition cycles would be required up to a total of, in this example, fifteen (15). It is noted that only one SCK pulse pair is inhibited during a TDM data frame. Consequently, in this example, for the worst case a total of 15 TDM data frames will be traversed prior to re-establishing synchronization with system timing.

What is claimed is:
1. Control memory apparatus comprising,
 a plurality of shift registers each connected in a recirculating configuration and arranged to form a matrix of storage cells,
 a source of a system timing signal and a system synchronization signal,
 means for storing a timing marker,
 means responsive to said system timing signal for advancing bits in said plurality of shift registers and said timing marker in said means for storing, means for detecting when said timing marker is out of synchronism with said system synchronization signal, and means for inhibiting advancing of said bits in said plurality of shift registers and said timing marker in said means for storing for a predetermined interval when said timing marker is out of synchronism with said synchronization signal.

2. The apparatus as defined in claim 1 wherein said means for detecting includes comparator means responsive to an output from said means for storing said timing marker and to said system synchronization signal for generating a control signal representative that there is no match between a signal at the output of said means for storing said timing marker and said system synchronization signal.

3. The apparatus as defined in claim 2 wherein said means for advancing includes means for supplying a clock signal representative of said system timing signal to said plurality of shift registers and to said means for storing said timing marker and wherein said means for inhibiting includes means responsive to said control signal and to said system timing signal for inhibiting supplying said clock signal for said predetermined interval.

4. The apparatus as defined in claim 3 wherein said means for storing said timing marker includes a shift register connected in a recirculating configuration.

5. The apparatus as defined in claim 4 wherein each of said shift registers has N stages.

6. The apparatus as defined in claim 5 wherein each of said shift registers is a dynamic shift register and wherein said means for supplying said clock signal supplies a non-overlapping clock signal.

7. The apparatus as defined in claim 6 wherein a data frame is delimited by successive ones of said synchronization signals and wherein said predetermined interval is a predetermined portion of said data frame.

8. The apparatus as defined in claim 7 wherein said data frame includes a predetermined number of time slot intervals and said predetermined portion of said data frame is one time slot interval.

* * * * *